Dec. 30, 1947.  J. BUCKO  2,433,734

MEANS FOR SUPPORTING TORCHES IN OXY-ACETYLENE CUTTING MACHINES

Filed April 5, 1943

INVENTOR:
JOHN BUCKO
BY: John E. Jackson
HIS ATTORNEY.

Patented Dec. 30, 1947

2,433,734

UNITED STATES PATENT OFFICE 2,433,734

MEANS FOR SUPPORTING TORCHES IN OXYACETYLENE CUTTING MACHINES

John Bucko, Gary, Ind.

Application April 5, 1943, Serial No. 481,904

3 Claims. (Cl. 248—283)

This invention relates to oxy-acetylene cutting machines for cutting steel plates and the like, and particularly, to an improved means for supporting a pair of torches thereon.

During the cutting of steel plates and the like by means of oxy-acetylene cutting torches, the cut edges of the plate are subjected to the intense heat of the flame of the torch causing uneven expansion of the metal along the cut edge of the plate which, of course, results in strains in the metal tending to warp the plate along the edge thereof. Heretofore, it was usually the practice to relieve such strains in the metal along the cut edges of the plate by placing the same in a normalizing furnace after the cutting operation. Such a practice was not only tedious and inconvenient but necessitated extra handling of the plates which involved considerable time and expense.

Accordingly, it is an object of this invention to provide an improved means for supporting a pair of torches on the arm of an oxy-acetylene cutting machine whereby the torches may be adjusted in any plane.

It is another object of the present invention to provide an improved means for supporting a pair of torches with one of the torches adapted to preheat or normalize the cut area of the plate and the other adapted to cut the same which is simple and inexpensive in its construction, and, at the same time, efficient and effective in its use.

Various other objects and advantages of this invention will be more apparent in the course of the following specification, and will be particularly pointed out in the appended claims.

In the accompanying drawings there is shown, for the purpose of illustration, an embodiment which my invention may assume in practice.

Figure 1:
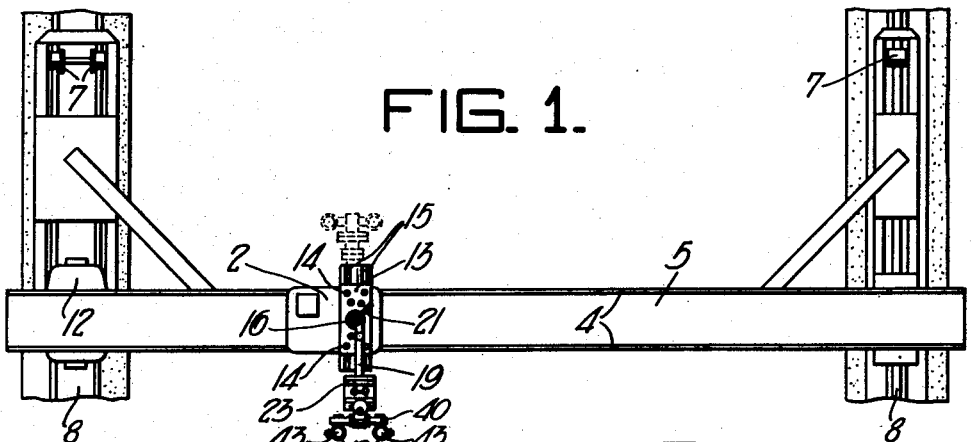
Figure 1 is a plan view of an oxy-acetylene cutting unit showing a cutting machine with which the improved torch supporting means of my invention incorporated therewith.
Figure 2:
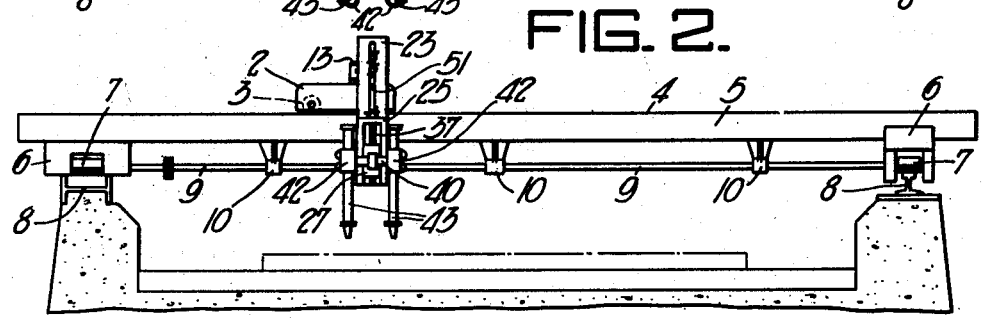
Figure 2 is a front elevational view of the cutting unit as shown in Figure 1.

Referring more particularly to the drawings, there is shown in Figures 1 and 2 thereof, a conventional type oxy-acetylene cutting machine 2 which consists generally of four wheels 3 arranged on the bottom thereof which are adapted to cooperate with the flanges 4 of an I-beam 5 for guiding the cutting machine along the plate to be cut which is arranged in a pit therebelow. In other words, the flanges 4 are adapted to act as a track for the wheels 3 of the cutting machine, as the same is moved along. At either end of the I-beam 5, there is arranged on the lower side thereof, a bracket member 6 in which there is rotatably mounted, a pair of rollers 7 which are disposed on rails 8 extending substantially perpendicular to the I-beam 5. In other words, the I-beam 5 together with the cutting machine 2 carried thereby, is mounted for movement on the rails 4 which cooperate with the rollers 7. There is arranged between at least one of the rollers 7 of each pair thereof, preferably a longitudinally extending shaft 9 which extends substantially parallel to the I-beam 5 and is journaled in a plurality of downwardly extending bracket members 10 mounted on the lower side thereof. One of the rails 8 consists preferably of an I-beam member and there is mounted on that end of the I-beam member 5, preferably a motor 12 which is suitably geared to the shaft 9 for rotating the same for moving the I-beam 5 together with the cutting machine 2 carried thereby along the rails 8.

Figure 3:
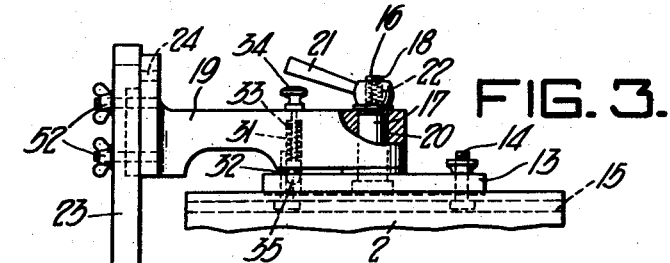
Figure 3 is an enlarged side elevational view of the improved torch supporting means of my invention.
Figure 4:
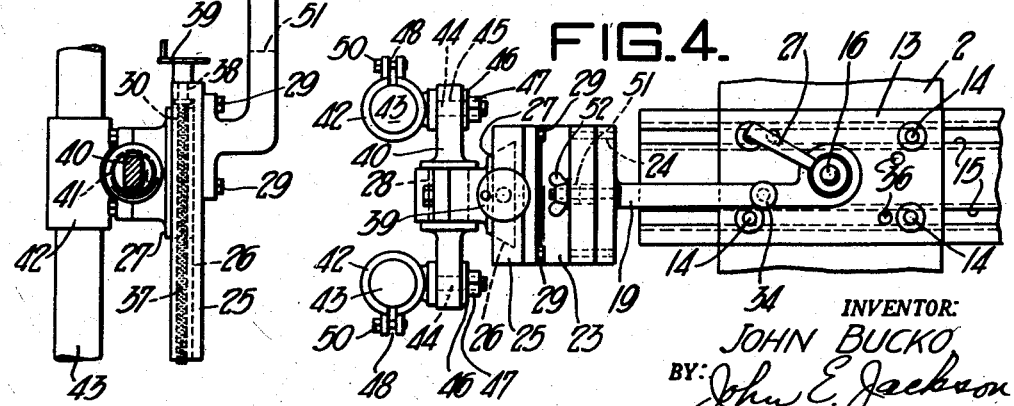
Figure 4 is a plan view thereof.

According to the present invention, as more clearly shown in Figures 3 and 4 of the drawings, there is arranged on top of the cutting machine 2, a plate-like member 13 which is held in position thereon preferably by means of four bolts 14, with the heads thereof adapted to fit in a pair of inverted T-shaped slots 15 disposed in the top of the head of the cutting machine. Centrally of the plate 13, there is arranged an upwardly extending stud-like member 16 having a journal portion 17 arranged intermediate the length thereof, and a threaded portion 18 disposed on the upper end of the same. There is provided, an outwardly extending arm 19 having a vertically disposed hole or bearing portion 20 arranged on the inner end thereof in which the journal portion 17 of the stud bolt 16 is disposed so as to provide a pivotal connection between the arm and the top of the cutting machine. On the upper end of the threaded portion 18 of the stud 16 above the hole in the arm 19, there is arranged a handle-like member 21 having a threaded portion 22 which is adapted to cooperate with the threaded portion 18 of the stud 16 so as to maintain the arm 19 in position on the stud 16, and to lock the same in its adjusted position thereon.

On the outer end of the arm 19 and extending substantially perpendicular thereto, there is arranged a downwardly extending arm-like member 23 which is attached thereto preferably by means of four removable bolts or cap screws 24. On the lower end of the arm-like member 23, there is arranged a removable member 25 having a vertically disposed groove 26, in which there is positioned a vertically movable plate-like member 27 having a bearing-like portion 28 carried thereby. The removable member 25 is attached to the lower end of the arm-like member 23 preferably by means of removable bolts or screws 29 disposed in the same relation as cap screws 24 for attaching the upper end of the arm-like member 23 to the outer end of the arm 19. There is arranged through the plate-like member 27 centrally thereof, a threaded hole 30 which is adapted to cooperate with the threaded portion of a vertically disposed screw 37 which extends downwardly through a hole 38 arranged in the upper end of the member 25. There is positioned on the upper end of the screw 37 above the member 25, preferably a handle 39 for rotating the screw 37. It will be seen that upon rotation of the screw 37, that the member 27 will be moved in a vertical plane in the groove 26 of the member 25.

In the bearing portion 28 of the slidable member 27, there is arranged a torch supporting member 40 having a journal-like portion 41 arranged intermediate the length thereof which is disposed in the bearing-like portion 28. On either end of the torch supporting member 40, there is arranged a rotatable annular member 42 for supporting an oxy-acetylene torch 43. Each of the annular members 42 has a threaded journal portion 44 arranged on the inner end thereof which is positioned in a hole 45 arranged through the member 40 for rotatably supporting each of the members 42 therein. There is arranged on the inner side of the member 40, at each of the members 42, a washer 46 and a nut 47 for holding the member in position in the hole 45 therein. Each of the annular members 42 is preferably split, as at 48, and has opposed extending lug portions through which there is arranged a cap screw 50 for securely clamping the cutting torch therein.

By providing such a construction, it will be seen that each of the cutting torches 43 may be adjusted in a horizontal plane by rotating the torch supporting member 40 in the bearing-like portion 28 of the member 27, and that both of the torches may be adjusted in a horizontal plane substantially perpendicular to the plane of the last mentioned adjustment by rotating each of the annular members 42 in the holes 45 of the torch supporting member 40. Furthermore, both of the torches can be adjusted in a vertical plane by means of the screw 37 which moves the member 27 together with the torch supporting member 40 carried thereby, when the screw is rotated by means of the handle 39.

The improved torch supporting means of my invention, is adapted to be used in the following manner. In one of the members 42, there is arranged a cutting torch and in the other, there is arranged a heating torch, as shown in Figures 1 and 2. The heating torch can be arranged so that it precedes the cutting torch as the cutting machine 2 moves along the plate or article to be cut. By such an arrangement, it will be seen that the heating torch preheats that area of the metal to be cut immediately before the cutting torch reaches this area. As a result, the metal is preheated and the strains in the metal are relieved and the cut edge of the material will not warp after the cutting operation. However, if it is desired to normalize the cut edge or edges of the plate after the cutting operation, the torches are arranged so that the cutting torch precedes the heating torch by moving the arm 19 to an offset position and holding it there by entering pin 32 in one of the upper holes 33. By this arrangement, it will be seen that the cutting is done first and that cut edge or edges of the plate are heated so as to normalize the same after the cutting operation. This latter arrangement may be preferred, particularly if a relatively thick plate or slab is being cut. In the event that sufficient heat cannot be supplied to the edge of the plate so as to normalize the same by means of a conventional type torch arranged thereabove, a plurality of torches may be used or the torch can be used having a plurality of nozzles arranged therein so that the heating is distributed over an extremely large range along the edge of the plate. Also, if desired, a torch may be arranged in the holder so that the flame is directed toward the edge of the plate substantially parallel to the plane thereof and perpendicular to the surface edge. In such case the scrap along the cut edge of the plate would have to be removed or cut frequently therefrom so as to permit the passage of the torch along the cut edge of the plate.

If desired, the arm-like member 23 may be vertically slotted as at 51 and a pair of thumb nuts 52 provided for securing the same to the outer end of the arm 19. By providing such an arrangement, the arm-like member 23 may be adjusted vertically so that the torches can be adjusted to any desired elevation below the end of the arm 19. It will be understood that the thumb nuts 52 are provided to hold the arm in its adjusted position. In such case the cap screws 24 are dispensed with unless the arm-like member 23 is disposed in its lower-most position, as shown in Figure 3 of the drawings.

If it is not desired to use the arm-like member 23, it can be removed from position on the end of the arm 19 by removing the cap screws 24, and the member 25 is then removed from the bottom of the arm-like member 23 by removing the cap screws 29. The torch holding member 25 is then assembled directly on the outer end of the arm 19 by replacing the cap screws 24 in the end of the arm, and the cap screws are then tightened so that the member 25 is securely mounted thereon. If desired, the arm 19, together with the arm-like portion 23, may be made integral with each other or in one piece.

It will be seen that the arm-like member 19, together with the cutting torch carried thereby, can be adjusted through an angle of 360 degrees, or in a complete circle. By such an arrangement, it will be seen that the cutting torch can be disposed either to one side or the other of the cutting machine 2, as desired, without disturbing or moving the cutting machine 2 or the beam 5, upon which it is movably mounted, or the plate being cut positioned therebelow. It will also be seen that by providing an arm which is adjustable angularly around the cutting machine, and one that is adjustable as to length for cutting slabs or plates of various thicknesses, that there is provided a torch cutting arm which is more flexible in its use than any arm heretofore suggested or used. Furthermore, it will be seen that the improved arm of my invention may be easily and conveniently incorporated with cutting machines now in use or with existing equipment without any material changes which is a decided advantage.

As a result of my invention, it will be seen that the plate is not only cut by the cutting torch upon movement of the cutting machine, but is simultaneously normalized by an additional torch so as to eliminate the need for any further normalizing of the plate thereby providing a finished plate having an evenly cut and straight edge.

In my copending application Serial No. 481,903, filed on even date herewith, now Patent Number 2,391,008, I have described and claimed similar means for attaching the arm 23 and the torch carrying means 25 to the horizontally rotatable arm 19.

While I have shown and described a specific embodiment of my invention, it will be understood that this embodiment is merely for the purpose of illustration and description and that various other forms may be devised within the scope of my invention, as defined in the appended claims.

I claim:

1. A support for cutting tools and the like comprising a rotatable member for adjusting a cutting tool circularly in a horizontal plane, a downwardly extending member arranged on the outer end of said rotatable member, means for attaching the upper end of the downwardly extending member to the outer end of the rotatable member, vertically adjustable means on the lower end of said member, a tool supporting bar rotatively mounted on the vertically adjustable means on the lower end of said downwardly extending member for rotation in a horizontal plane on its longitudinal axis and a plurality of clamps rotatively mounted on said bar for rotation in a vertical plane normal to the longitudinal axis of said bar.

2. In a support for cutting tools and the like having a rotatable member for adjusting a cutting tool circularly in a horizontal plane, a downwardly extending member arranged on the outer end of said rotatable member and means for attaching the upper end of the downwardly extending member to the outer end of the rotatable member, the improvement consisting in a tool supporting bar rotatively mounted on the lower end of said downwardly extending member for rotation in a horizontal plane on its longitudinal axis and a plurality of clamps rotatively mounted on said bar for rotation in a vertical plane normal to the longitudinal axis of said bar.

3. In a support for cutting tools and the like having a rotatable member for adjusting a cutting tool circularly in a horizontal plane, a downwardly extending member arranged on the outer end of said rotatable member and means for attaching the upper end of the downwardly extending member to the outer end of the rotatable member, the improvement consisting in vertically adjustable means on the lower end of said downwardly extending member, a tool supporting bar rotatively mounted on the vertically adjustable means on the lower end of said downwardly extending member for rotation in a horizontal plane on its longitudinal axis and a plurality of clamps rotatively mounted on said bar for rotation in a vertical plane normal to the longitudinal axis of said bar.

JOHN BUCKO.

REFERENCES CITED

The following references are of record in the file of this patent:

UNITED STATES PATENTS

| Number | Name | Date |
|---|---|---|
| 934,235 | Teschemacher et al | Sept. 14, 1909 |
| 1,728,104 | Claude | Sept. 10, 1929 |
| 2,107,396 | Schoitz | Feb. 8, 1938 |
| 895,026 | Jottrand et al. | Aug. 4, 1908 |
| 2,183,605 | Bucknam et al. | Dec. 19, 1939 |
| 2,259,956 | Jones | Oct. 21, 1941 |
| 2,296,832 | Bowers | Sept. 29, 1942 |
| 2,130,261 | Bucknam | Sept. 13, 1938 |
| 2,305,909 | Stoneberg | Dec. 22, 1942 |
| 2,391,008 | Bucko | Dec. 18, 1945 |

FOREIGN PATENTS

| Number | Country | Date |
|---|---|---|
| 312,193 | Great Britain | 1930 |